United States Patent [19]

Yamazaki et al.

[11] Patent Number: 4,844,588
[45] Date of Patent: * Jul. 4, 1989

[54] LIQUID CRYSTAL DISPLAY PANEL AND MANUFACTURING METHOD THEREOF

[75] Inventors: Shunpei Yamazaki; Takashi Inushima; Akira Mase; Toshimitsu Konuma; Minoru Miyazaki; Mitsunori Sakama, all of Tokyo, Japan

[73] Assignee: Semiconductor Energy Laboratory Co., Ltd., Tokyo, Japan

[*] Notice: The portion of the term of this patent subsequent to May 9, 2006 has been disclaimed.

[21] Appl. No.: 148,097

[22] Filed: Jan. 25, 1988

Related U.S. Application Data

[63] Continuation of Ser. No. 797,003, Nov. 12, 1985, abandoned.

[30] Foreign Application Priority Data

Nov. 12, 1984 [JP] Japan ................. 59-238985

[51] Int. Cl.⁴ .......................................... G02F 1/135
[52] U.S. Cl. ................. 350/339 R; 350/334; 350/336; 350/344
[58] Field of Search ........... 350/332, 334, 336, 339 R, 350/344; 340/784; 357/21, 55

[56] References Cited

U.S. PATENT DOCUMENTS

| | | | |
|---|---|---|---|
| 3,654,606 | 4/1972 | Marlowe et al. | 350/332 |
| 4,223,308 | 9/1980 | Baraff et al. | 340/784 |
| 4,552,437 | 11/1985 | Gantenbrink et al. | 350/339 R |
| 4,560,241 | 11/1985 | Stolov et al. | 350/339 R |
| 4,589,733 | 5/1986 | Yaniv et al. | 350/332 |
| 4,601,546 | 7/1986 | Ohta | 350/339 R |
| 4,639,087 | 1/1987 | Cannella | 350/336 |

Primary Examiner—Bruce Y. Arnold
Assistant Examiner—Martin Lerner
Attorney, Agent, or Firm—Gerald J. Ferguson, Jr.

[57] ABSTRACT

A method for manufacturing a liquid crystal device including forming a semiconductor layer on a first substrate and an underlying conductive layer; separating the semiconductor layer and the underlying conductive layer into the elements of an array by removing the parts of the semiconductor and the conductive layer between the elements; insulating the side surfaces of the elements of said array; forming an overlying conductive layer on the first substrate over the array; removing the conductive layer other than at least one strip extending over a part of each surface of the elements arranged in a line, together with the underlying semiconductor layer whereby parts of the separated underlying conductors are exposed in the form of a plurality of first electrodes; and mating the first substrate to a second substrate having a plurality of second electrodes corresponding to the first electrodes, with a liquid crystal layer in between.

5 Claims, 12 Drawing Sheets

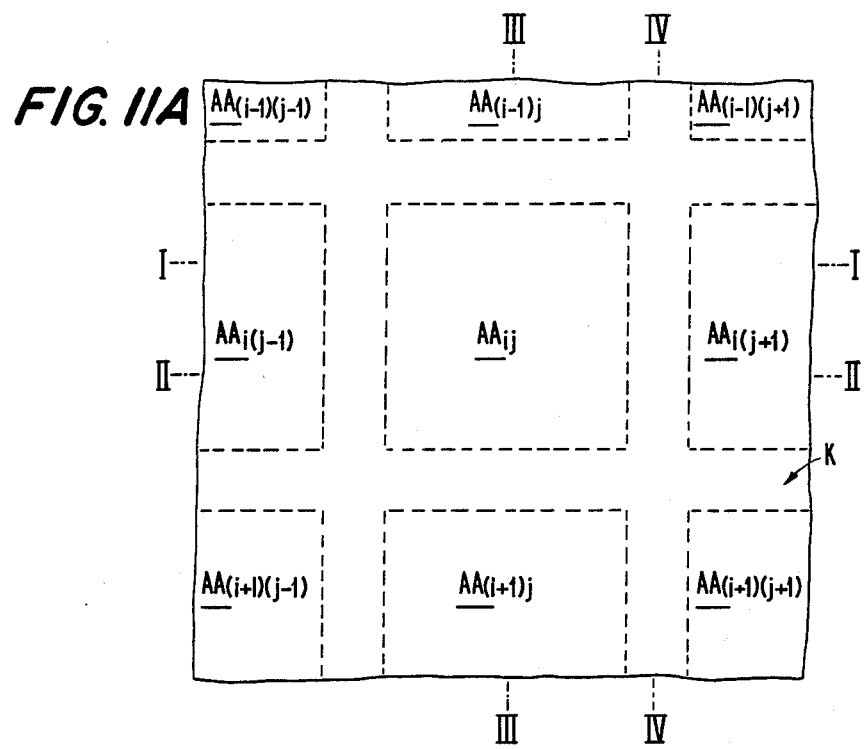
FIG. IIA
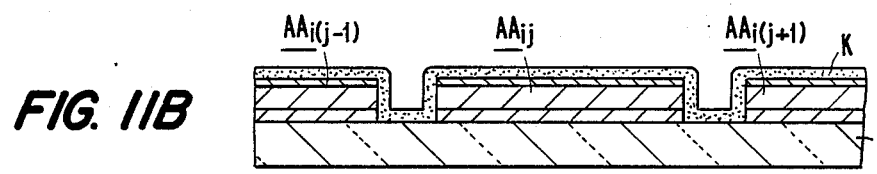
FIG. IIB
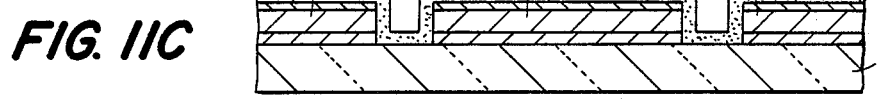
FIG. IIC
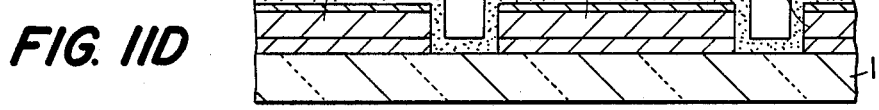
FIG. IID
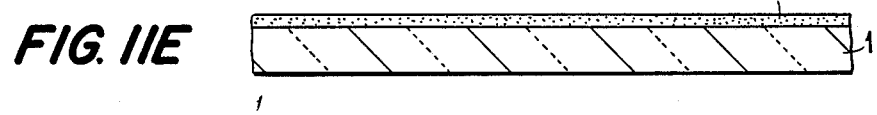
FIG. IIE

LIQUID CRYSTAL DISPLAY PANEL AND MANUFACTURING METHOD THEREOF

This application is a continuation of Ser. No. 797,003 filed 11/12/85 now abandoned.

BACKGROUND OF THE INVENTION

1. Field of the Invention

The present invention relates to a liquid crystal display panel which employs liquid crystal display devices each of which has a nonlinear element having a diode characteristic and a liquid crystal element. The invention also pertains to methods for the manufacture of the liquid crystal display panel.

2. Description of the Prior Art

Heretofore there has been proposed a display panel which employs a plurality of $m \times n$ (where $n \geq 1$ and $m \geq 1$) liquid crystal display devices $M_{11}$ to $M_{1n}$, $M_{21}$ to $M_{2n}$, ... and $M_{m1}$ to $M_{mn}$. The liquid crystal display device $M_{ij}$ (where $i=1, 2 \ldots n$, $j=1, 2 \ldots n$) has a nonlinear element $U_{ij}$ having a diode characteristic and a liquid crystal element $L_{ij}$.

In this display panel, the liquid crystal display device $M_{ij}$ is connected to a row conductive layer $F_i$ and a column conductive layer $H_j$ at their intersection.

With such a display panel, an image display can be provided by driving the liquid crystal devices $M_{11}$ to $M_{mn}$ using the row conductive layers $F_i$ to $F_m$ and the column conductive layers $H_1$ to $H_n$.

However, the conventional display panel is very complex in the structure of the nonlinear element $U_{ij}$, in the structure of the liquid crystal element $L_{ij}$ and in the structure for connecting the liquid crystal display device $M_{ij}$ to the row conductive layer $F_i$ and the column conductive layer $H_j$.

On this account, the prior art liquid crystal display panel is difficult to manufacture and expensive.

Furthermore, it is difficult to arrange $m \times n$ liquid crystal display devices $M_{11}$ to $M_{mn}$ in an $(m \times n)$ matrix form with a high density, so that resolution of the image display is relatively low.

SUMMARY OF THE INVENTION

It is therefore an object of the present invention to provide a novel liquid crystal display panel which employs liquid crystal display devices each of which has a liquid crystal element and a nonlinear element having a diode characteristic and connected in series with the nonlinear element.

Another object of the present invention is to provide novel methods for the manufacture of such liquid crystal display panel.

In accordance with an aspect of the present invention, the liquid crystal display panel comprises (a) first and second substrate members disposed opposite at a predetermined distance in substantially parallel relation to each other and (b) liquid crystal filled between the first and second substrate members.

The first substrate member comprises (a) a first substrate having an insulating surface, (b) a plurality of $m \times n$ ($m>1$, $n>1$) of rectangular conductive layer $C_{11}$ to $C_{1n}$, $C_{21}$ to $C_{2n}$, ... $C_{m1}$ to $C_{mn}$ arranged on the substrate in a matrix form, (c) a layers $Q_{ij}$ formed on the conductive layer $C_{ij}$ (where $i=1, 2 \ldots m$ and $j=1, 2 \ldots n$), the layer $Q_{ij}$ having substantially the same width as of the conductive layer $Q_{ij}$, and the both side surfaces defining the width of the layer $Q_{ij}$ being substantially in agreement with both side faces defining the width of the conductive layer $C_{ij}$, (d) a conductive layer $E_{ij}$ formed on the layer $Q_{ij}$ and having the same width and length as the later, and all of the side surfaces of the conductive layer $E_{ij}$ being substantially in agreement with the all of the side faces of the layer $Q_{ij}$, (e) a portion $D_{ij}$ of the conductive layer $C_{ij}$ underlying the layer $Q_{ij}$, the layer $Q_{ij}$ and the conductive layer $E_{ij}$ constituting a laminate member $A_{ij}$, (f) insulating layers $K_{ij}$ and $K_{ij}'$ formed over the entire areas of side faces defining the length of the laminate member $A_{ij}$, respectively and (g) a strip-like conductive layer $F_i$ formed on the first substrate and extending in the row direction, the conductive layer $F_i$ having substantially the same width as of the laminate member $A_{ij}$ and extending on the side faces of the insulating layer $K_{ij}$ and $K_{ij}'$ and onto the insulating layer $K_{ij}$ and $K_{ij}'$ and the laminate member $A_{ij}$, and the both side faces defining the width of the conductive layer $F_i$ being substantially in agreement with the both side faces defining the width of the laminate member $A_{ij}$.

The second substrate member comprises (a) a second substrate having an insulating surface, and (b) a plurality $n \times q$ (where q is an integer equal to or greater than 1) of stripe-like conductive layers $H_{11}$, $H_{12} \ldots H_{1q}$; $H_{21}$, $H_{22} \ldots H_{2q}$; ... and $H_{n1}$, $H_{n2}$ $H_{n3} \ldots H_{nq}$ sequentially arranged on the second substrate in the row direction and extending in the column direction, the conductive layers $H_{j1}$ to $H_{jq}$ being opposite the conductive layers $C_{ij}$ to $C_{mj}$.

The laminate member $A_{ij}$ forms a nonlinear element $U_{ij}$. The conductive layer $H_{jr}$ (where $r=1, 2, \ldots y$), a portion $D_{ijr}$ of the conductive layer $C_{ij}$ confronting the conductive layer $H_{jr}$ and the portion of the liquid crystal between the conductive layer $H_{jr}$ and the portion $B_{ijr}$ forms a liquid crystal element $L_{ijr}$.

According to such a liquid crystal display panel of the present invention, the liquid crystal element $L_{ijr}$ can be driven by applying a driving signal to the liquid crystal display element $M_{ijr}$ via the row conductive layer $F_i$ and the column conductive layer $H_{jr}$. Accordingly, the liquid crystal display panel provides an image display.

Since the liquid crystal element $L_{ijr}$ is formed by the conductive layer $H_{jr}$, the portion $B_{ijr}$ of the conductive layer $C_{ij}$ facing the conductive layer $H_{jr}$ and the portion of the liquid crystal between the conductive layer $H_{jr}$ and the portion $B_{ijr}$, as mentioned above, the liquid crystal element $L_{ijr}$ is simple in structure.

Furthermore, the nonlinear element $U_{ij}$ is formed by the aforementioned laminate member $A_{ij}$, and hence is simple in construction.

The liquid crystal display panel of the present invention is simple-structured in that the liquid crystal display element $L_{ijr}$ and the nonlinear element $U_{ij}$ are interconnected in series via the conductive layer $C_{ij}$ to constitute the liquid crystal display device $M_{ijr}$ and in that the liquid crystal display device $M_{ijr}$ is connected at one side to the row conductive layer $F_i$ forming the other electrode of the nonlinear element $U_{ij}$ and at the other side to the column conductive layer $H_{jr}$ forming the other electrode of the liquid display element $L_{ijr}$.

Accordingly, the liquid crystal display panel of the present invention is far simpler in structure than is conventional, in consequence of which $m \times (m \times q)$ display crystal elements $M_{111}$ to $M_{mnq}$ can be arranged in an $m \times (n \times q)$ matrix form with a high density, ensuring to provide an image display with high resolution.

Moreover, according to the present invention, the liquid crystal display panel which has the aforesaid excellent feature can be produced by a manufacturing method of the present invention which includes a step of (A) preparing a first substrate member, (B) preparing a second substrate member, (C) turning the second substrate member upside down and disposing the first and second substrate members in opposing and substantially parallel relation to each other and (D) filling liquid crystal in the gap defined by the first and second substrate members.

The step of preparing a first substrate member which includes the steps of (a) forming, on a first substrate, a laminate member A composed of a conductive layer C, a layer Q and a conductive layer E laminated in this order, (b) patterning the laminate member A into a plurality m×n (m>1, n>1) of rectangular laminate members $AA_{11}$ to $AA_{1n}$, $AA_{21}$ to $AA_{2n}$ ... $AA_{m1}$ to $AA_{mn}$ sequentially arranged in matrix form the laminate member $A_{ij}$ (where i=1, 2 ... m and j=1, 2 ... n) being composed of a conductive layer $C_{ij}$, a layer $QQ_{ij}$ and a conductive layer $EE_{ij}$, (c) depositing a insulating layer K having a thickness smaller than the laminate members $AA_{11}$ to $AA_{mn}$ over the entire area of the first substrate to cover the laminate members $AA_{11}$ to $AA_{mn}$, (d) selectively etching away the insulating layer K to form insulating layer $KK_i$ on all of the side surfaces of the laminate member $AA_{ij}$, (e) forming a conductive layer F over the entire area of the first substrate to cover the laminate members $AA_{11}$ to $AA_{mn}$ and the insulating layers $KK_1$ to $KK_m$ and (f) patterning the conductive layer F, the conductive layers $EE_{i1}$ to $EE_{in}$ and the layers $QQ_{i1}$ to $QQ_{in}$ to form a conductive layers $F_i$ extending from the first substrate onto the insulating layer $KK_i$ and the laminate member $AA_{i1}$ $AA_{in}$ passing on the side faces of the insulating layer $KK_i$, the layers $Q_{i1}$ to $Q_{in}$ and conductive layers $E_{i1}$ to $E_{in}$, a portion of the conductive layer $F_i$ over lying the layer $Q_{ij}$, the layer $Q_{ij}$ and a portion of the conductive layer $C_{ij}$ underlying the layer $Q_{ij}$ constituting the laminate member $A_{ij}$.

The step of preparing a second substrate member includes the steps of forming, on a second substrate having an insulating surface, a plurality n×q (where q is an integer equal to or greater than 1) conductive layers $H_{11}$, $H_{12}$ ... $H_{1q}$; $H_{21}$, $H_{22}$ ... $H_{2q}$; $H_{31}$, $H_{32}$ ... $H_{3q}$; ... and $H_{n1}$, $H_{n2}$ ... $H_{nq}$ sequentially arranged in the row direction and extending in the column direction, the conductive layers $H_{j1}$, $H_{j2}$, ... and $H_{iq}$ corresponding to the conductive layers $C_{ij}$, $C_{2j}$, ... and $C_{mj}$ of the first substrate member.

The manufacturing method of the present invention requires only three masks for the fabrication of the liquid crystal display, that is, one for the formation of the laminate member $AA_{11}$ to $AA_{mn}$, one for the formation of the conductive layers $F_1$ to $F_m$ and the laminate members $A_{11}$ to $A_{mn}$ and one for the formation of the conductive layers $H_{11}$~$H_{1r}$ to $H_{n1}$~$H_{nr}$.

Accordingly, the liquid crystal display panel having the abovesaid advantages can easily be manufactured at low cost.

Other objects, features and advantages of the present invention will become more fully apparent from the following detailed description taken in conjunction with the accompanying drawings.

BRIEF DESCRIPTION OF THE DRAWINGS

FIGS. 9 to 14 are diagrams for explaining the manufacture of the liquid crystal display panel by the method of the present invention;

DESCRIPTION OF THE PREFERRED EMBODIMENTS

Figure 1:
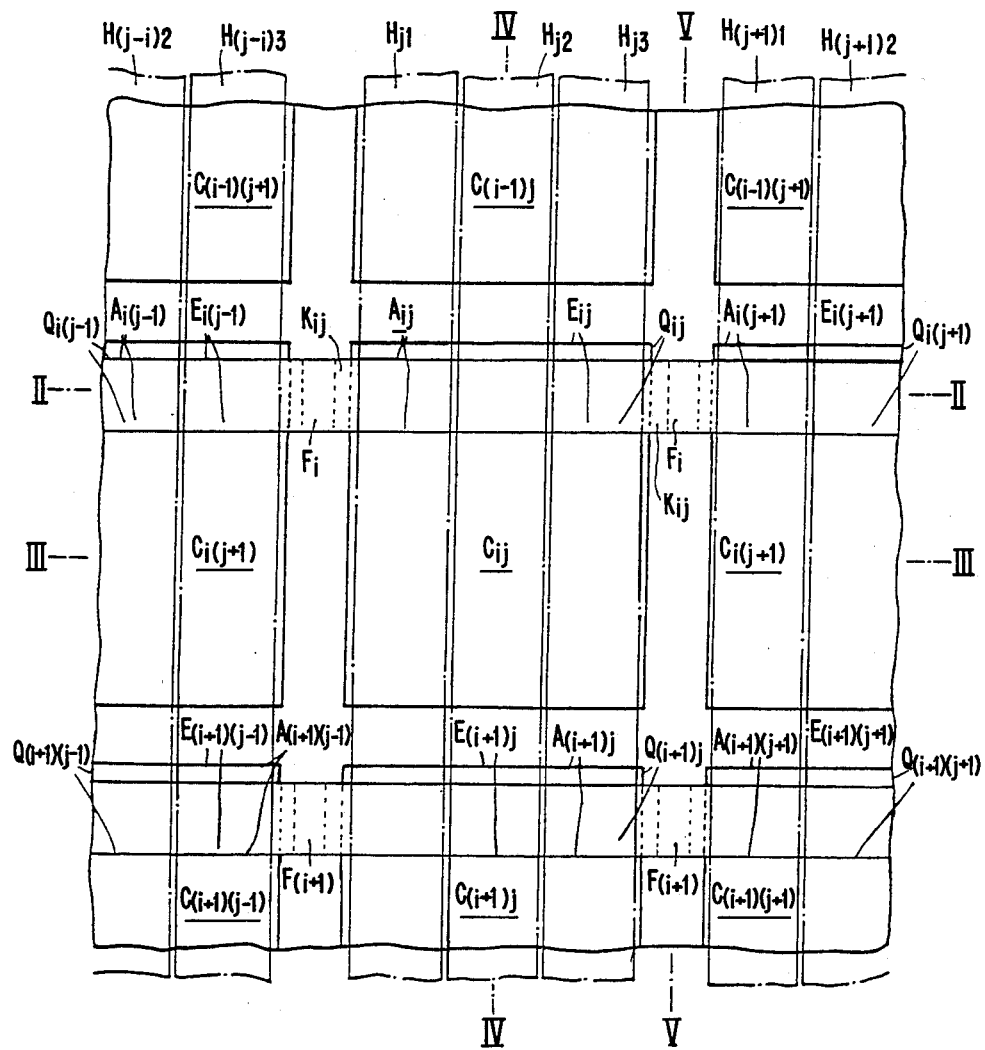
FIG. 1 is a plan view schematically illustrating an embodiment of the liquid crystal display panel of the present invention.
Figure 2:
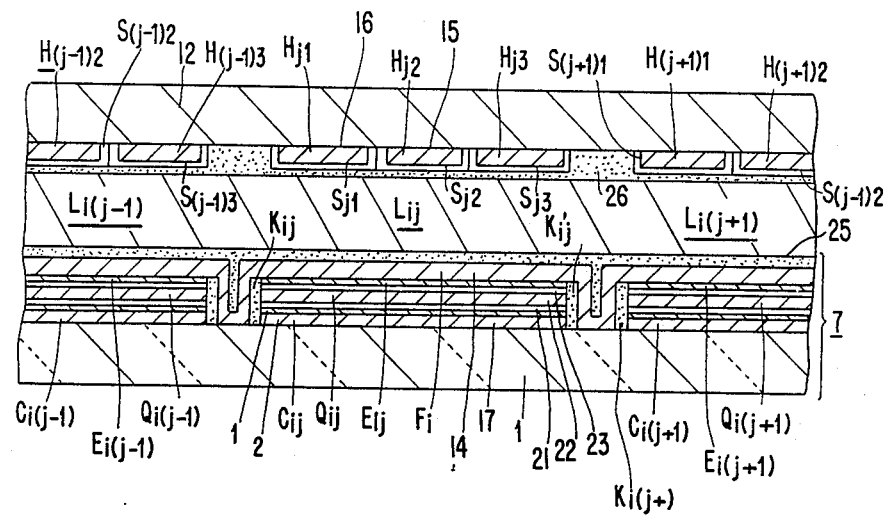
FIGS. 2, 3, 4 and 5 are sectional views respectively taken on the lines II—II, III—III, IV—IV and V—V in FIG. 1.
Figure 3:
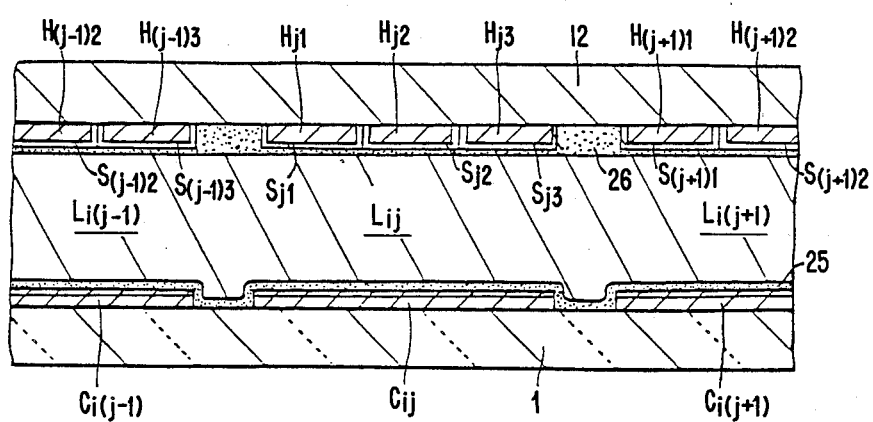
Figure 4:
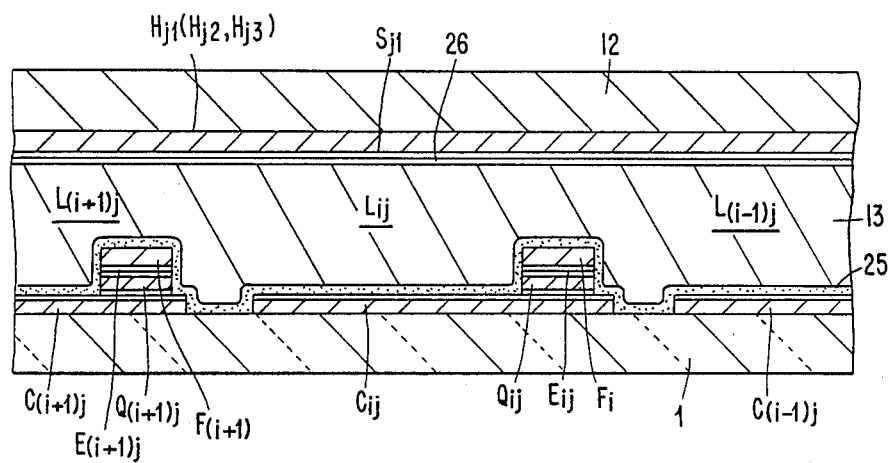
Figure 5:
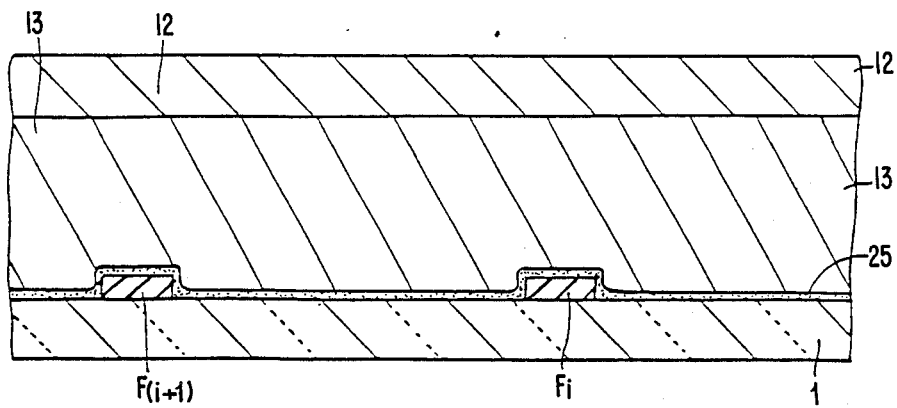

FIGS. 1 to 5 illustrate an embodiment of the liquid crystal display panel of the present invention, in which a substrate 1 has an insulating surface. The substrate 1 is formed of, for instance, alkaline free glass.

The substrate 1 has arranged thereon in a matrix form a plurality m×n (where m>1, n≧1) of conductive layers $C_{11}$ to $C_{1n}$, $C_{21}$ to $C_{2n}$ ... $C_{m1}$ to $C_{mn}$. The conductive layer $C_{ij}$ (where i=1, 2 ... m and j=1, 2 ... n) is rectangular in shape and has a relatively large area, for example, 100 μm wide and 150 μm long. The conductive layer $C_{ij}$ may preferable be composed of a layer 2 formed of, for example, aluminum and a nontransparent layer 3 formed of, for instance chromium.

The conductive layer $Q_{ij}$ has formed thereon a layers $Q_{ij}$ formed of, for example, non-singlecrystal semiconductor. The layers $Q_{ij}$ has same width and length as the conductive layer $C_{ij}$.

The layer $Q_{ij}$ (where i=1, 2 ... m and j=1, 2 ... n) may have, for example, an n-i-n type structure composed of an n-type layer, an i-type layer and an n-type layer, an n-i-p (or p⁻)-i-n type structure composed of an n-type layer, an i-type layer, a p(or p⁻)-type layer, an i-type layer and an n-type layer, a p-i-p type structure composed of a p-type layer, an i-type layer and a p-type layer, or a p-i-n(or n⁻)-i-p type structure composed of a p-type layer, an i-type layer, an n(or n⁻)-type layer, an i-type layer and an p-type layer. The layer $Q_{ij}$ also may be only a very thin insulating layer which may pass tunnel current. But FIGS. 1 to 5 show the case where the layer $Q_{ij}$ has the n-i-n type structure. For the sake of brevity, the following description will be made in connection with the case where the layer $Q_{ij}$ has the n-i-n type structure.

The layer $Q_{ij}$ has an n-type non-single-crystal silicon layer 21 formed on the row conductive layer $F_i$, and i-type layer 22 of non-single-crystal semiconductor formed on the layer 21 and an n-type non-single-crystal silicon layer 23 formed on the layer 22. The layer 22 is formed principally of silicon but contains carbon (C), nitrogen (N) or oxygen (O) in an amount of 1/10 or less relative to the silicon, and hence is formed of non-single-crystal semiconductor expressed by $Si_xC_{1-x}$ (where 0<x<1).

The layer $Q_{ij}$ is covered over the entire area of its top surface with a conductive layer $E_{ij}$. The conductive layer $E_{ij}$ is formed of, for instance, chromium.

The part of the conductive layer $C_{ij}$ underlying the layer $Q_{ij}$, the layer $Q_{ij}$ and the conductive layer $E_{ij}$ make up a layer member $A_{ij}$.

The layer member $A_{ij}$ are covered over the entire area of its opposite side surfaces defining the length thereof with insulating layers $K_{ij}$ and $K_{ij}'$, respectively. The insulating layers $K_{ij}$ and $K_{ij}'$ are formed of, for instance, silicon nitride or silicon oxide and have 0.1 to 0.5 μm in thickness.

The substrate 1 has sequentially arranged thereon a plurality m of strip-like conductive layer $F_1, F_2 \ldots F_m$ in the column direction.

The conductive layer $F_i$ extends on the layer member $A_{ij}$ i.e. the conductive layer $E_{ij}$ and the insulating layer $K_{ij}$ and $K_{ij}'$ through the side surfaces of the insulating layer $K_{ij}$ and $K_{ij}'$ and make contact with the conductive layer $E_{ij}$. The conductive layer $F_i$ has substantially same width as of the layer member $A_{ij}$ i.e. the conductive layer $E_{ij}$ and is formed of, for instance, chromium and is nontransparent. In this case, the opposing side surfaces of the conductive layer $F_i$, which determine the width of the conductive layer $F_i$ are substantially aligned with the opposing side surfaces of the layer member $A_{ij}$, which determine the width of the layer member $A_{ij}$.

Furthermore a relatively thin insulation protecting layer 25 is deposited on the substrate 1 to cover the conductive layer $C_{11}$ to $C_{mn}$, the laminate layers $A_{11}$ to $A_{1n}, A_{21}$ to $A_{2n} \ldots A_{m1}$ to $A_{mn}$, the insulating layer $K_{11}$ to $K_{mn}$ and $K_{11}$, to $K_{mn}$, and parts of the conductive layers $C_{11}$ to $C_{1n}, C_{21}$ to $C_{2n} \ldots C_{m1}$ to $C_{mn}$ which are not covered with the conductive layers $Q_{11}$ to $Q_{1n}, Q_{21}$ to $Q_2 \ldots Q_{m1}$ to $Q_{mn}$.

The conductive layers $Q_{11}$ to $Q_{mn}$, the layer members $A_{11}$ to $A_{mn}$, the insulating layers $K_{11}$ to $K_{mn}$ and $K_{11}'$ to $K_{mn}'$ and the conductive layers $F_1$ to $F_m$ make up a substrate member 7.

The substrate member 7 is formed, for example, as follows:

A conductive layer C which will ultimately form the conductive layers $C_{11}$ to $C_{mn}$, a layer Q which will ultimately form the layers $Q_{11}$ to $Q_{mn}$ and a conductive layer E which will ultimately form the conductive layers $E_{11}$ to $E_{mn}$ are deposited in that order on the substrate 1, as shown in FIGS. 9A to 9E. The conductive layer C, the layer Q and the conductive layer E make up a layer member A which will ultimately form the layer members $A_{11}$ to $A_{mn}$.

The conductive layer C may be formed by a known method, for instance, a sputtering or electron beam evaporation process.

A layer Q also may be formed by a known method, for example, a CVD, plasma CVD or photo CVD method.

In my experiment, the substrate 1 formed thereon the conductive layer C was loaded through a loading and unloading chamber into a first reaction chamber, wherein a glow discharge was produced over the substrate 1 at a high frequency of 13.56 MHz in an atmosphere containing silane SiH$_4$, phosphine PH$_3$ and hydrogen, with the substrate temperature held in the range of 200 to 250 C. As a result of this, an ntype microcrystalline silicon layer, which had a conductivity of $10^{-2}$ to $10^2$ (ωcm)$^{-1}$ and contained hydrogen as a recombination center neutralizer, was deposited 300 to 1000 Å thick on the conductive layer F. Next, the substrate 1 was moved from the first reaction chamber into the next second reaction chamber, wherein a gas mixture of silane Si$_m$H$_{2m+2}$ (where m=1, 2, 3, ...) (for example, SiH$_4$) and methyl silane SiH$_n$(CH$_3$)$_{4-n}$ (where n=1, 2, 3) was discharged into a plasma, by which an i-type nonsingle-crystal silicon layer of Si$_x$C$_{1-x}$ was deposited 0.2 to 1 μm thick on the n-type layer. After this, the substrate 1 was returned from the second reaction chamber to the first reaction chamber, wherein another n-type layer similar to the above n-type layer was deposited by the same method on the i-type non-single-crystal silicon layer, thus obtaining the laminate member Q having the n-i-n type structure.

The conductive layer E may also be formed by a known method, for instance, a sputtering or electron beam evaporation process.

Next, the layer member A is subjected to a known layer pattern process using a first mask, providing m×n layer members AA$_{11}$ to AA$_{mn}$ of the same pattern as the conductive layers C$_{11}$ to C$_{mn}$, as shown in FIGS. 10A to 10E.

Next, a insulating layer K which will ultimately form the insulating layer K$_{11}$ to K$_{mn}$ and K$_{11}'$ to K$_{mn}'$ and which is relatively thin than the layer member AA$_{11}$ to AA$_{mn}$ is deposited by a known method, for example, plasma CVD method on the entire surface of the substrate 1 to cover the laminate layers AA$_{11}$ to AA$_{mn}$, as shown in FIGS. 11A to 11E.

Next, the insulating layer K is selectively etched away by a known method, for example, a plasma etching method to form insulating layers KK$_{ij}$ on all of the sides of the laminate member AA$_i$ as shown in FIGS. 12A to 12E.

Next, a conductive layer F is deposited on the entire area of the substrate 1 to cover the laminate member AA$_{11}$ to AA$_{mn}$ and the insulating layers KK$_{11}$ to KK$_{mn}$ as shown in FIGS. 13A to 13E.

Next, the conductive layer F, the layers QQ$_{11}$ to QQ$_{m1}$ and the conductive layer EE$_{11}$ to EE$_{mn}$ of the layer members AA$_{11}$ to AA$_{mn}$ are patterned by a known method using a second mask into the conductive layers F$_1$ to F$_m$, the layers Q$_{11}$ to Q$_{mn}$ and the conductive layers E$_{11}$ to E$_{mn}$ as shown in FIGS. 14A to 14E. In this case, the conductive layer C$_{11}$ to C$_{mn}$ are not patterned. The layer Q$_{ij}$, the part of the conductive layer C$_{ij}$ underlying the layer Q$_{ij}$ and the conductive layer E$_{ij}$ make up the laminate member A$_{ij}$.

Next, the insulating layers KK$_{11}$ to KK$_{mn}$ are selectively etched away by a known method into the insulating layer K$_{11}$ to K$_{mn}$ and K$_{11}'$ to K$_{mn}'$.

Next, the thin insulation protecting layer 25 is deposited on the entire surface of the substrate 1 to cover the conductive layers F$_1$ to F$_m$, the layer members A$_{11}$ to A$_{mn}$, the insulating layers K$_{11}$ to K$_{mn}$ and K$_{11}'$ to K$_{mn}'$ and the part of the conductive layers C$_{11}$ to C$_{mn}$ which are not covered with the layers Q$_{11}$ to Q$_{nm}$.

Referring now back to FIGS. 1 to 5, another substrate member 11, which is different from the aforementioned substrate member 7 is provided.

The substrate member 11 has, on a substrate 12 corresponding to the substrate 1, a plurality of n×q (where q≧1, in this instance q=3) sequentially arranged column conductive layers H$_{11}$, H$_{12}$ and H$_{13}$; H$_{21}$, H$_{22}$ and H$_{23}$; ... H$_{n1}$, H$_{n2}$ and H$_{n3}$ which are arranged opposing relation to the conductive layers C$_{11}$ to C$_{m1}$; C$_{12}$ to C$_{m2}$; ... C$_{1n}$ to C$_{mn}$, respectively and extend in the column direction. The column conductive layer H$_{j1}$, H$_{j2}$ and $H_{j3}$ can be obtained by forming a conductive layer through a known method on the substrate 12 and then patterning the conductive layer through a third mask.

The column conductive layers $H_{j1}$, $H_{j2}$ and $H_{j3}$ are covered over entire surfaces thereof with red, green and blue filters $S_{j1}$, $S_{j2}$ and $S_{j3}$, respectively.

Furthermore, a insulation protecting layer 26 formed of, for instance, organic region is deposited on the entire surface of the substrate 12 by a known method, for example, coating to cover the filters $S_{11}$ to $S_{n1}$, $S_{12}$ to $S_{n2}$ and $S_{13}$ to $S_{n3}$.

The substrate member 11 is disposed upside down by a suitable support means (not shown) in opposing relation to the top of the substrate member 7 in parallel thereto. In this instance, the conductive layers $C_{ij}$ to $C_{mj}$ of the substrate member 7 and the column conductive layers $H_{j1}$, $H_{j2}$ and $H_{j3}$ of the substrate member 11 are held face-to face with each other.

A space defined by the substrate members 7 and 11 is filled with liquid crystal 13.

In the structure described above in conjunction with FIGS. 1 through 5, a part 14 of the conductive layer $C_{ij}$ on the substrate 1 and a part 15 of the conductive layer $H_{jr}$ (where r=1, 2, 3) on the substrate 12, which are face-to-face with each other and a part 16R of the liquid crystal 13 between the part 14 of the conductive layer $C_{ij}$ and the part 15 of the conductive layer $H_{jr}$ constitute a liquid crystal element $L_{ijr}$ which employs the parts 14 and 15 as its electrodes $B_{ijr}$ and $B_{ijr}'$, respectively.

When low voltages are applied across the part 14 serving as electrode $B_{ijr}$ of the conductive layer $C_{ij}$ and the part 15 serving as electrode $B_{ijr}'$ of the conductive layer $H_{jr}$, the liquid crystal element $L_{ije}$ remain opaque, but when high voltages are applied, it become transparent.

Figure 6:
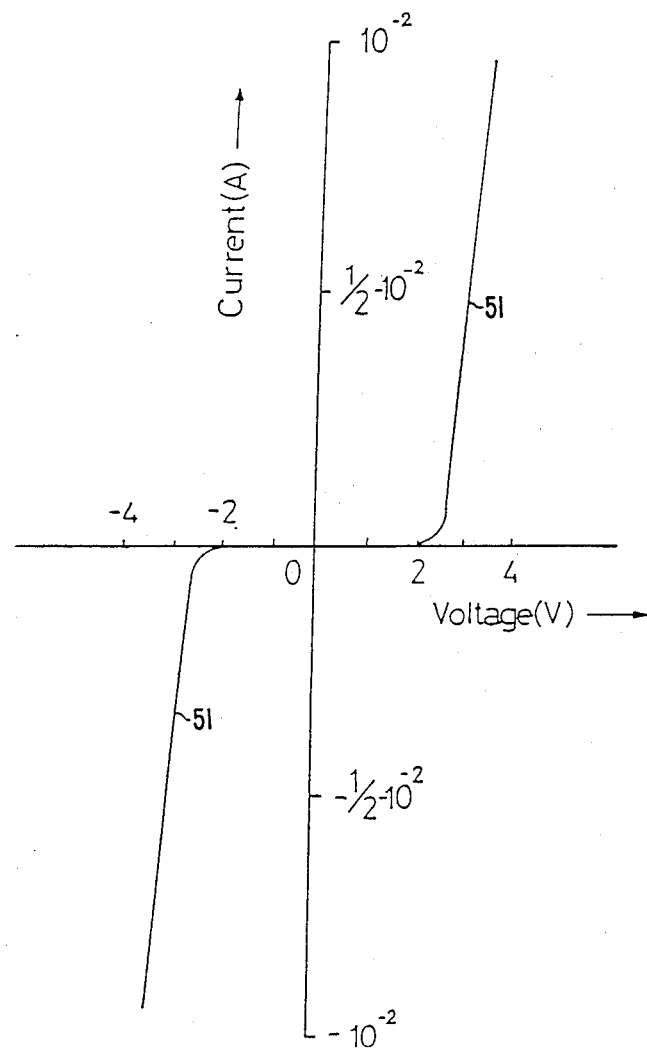
In FIG. 6 is a graph showing the voltage (V)-current(I) characteristics of the nonlinear element used in the liquid crystal display panel of the present invention depicted in FIGS. 1 to 5, in comparison with the V-I characteristics of a conventional nonlinear element.
Figure 7:
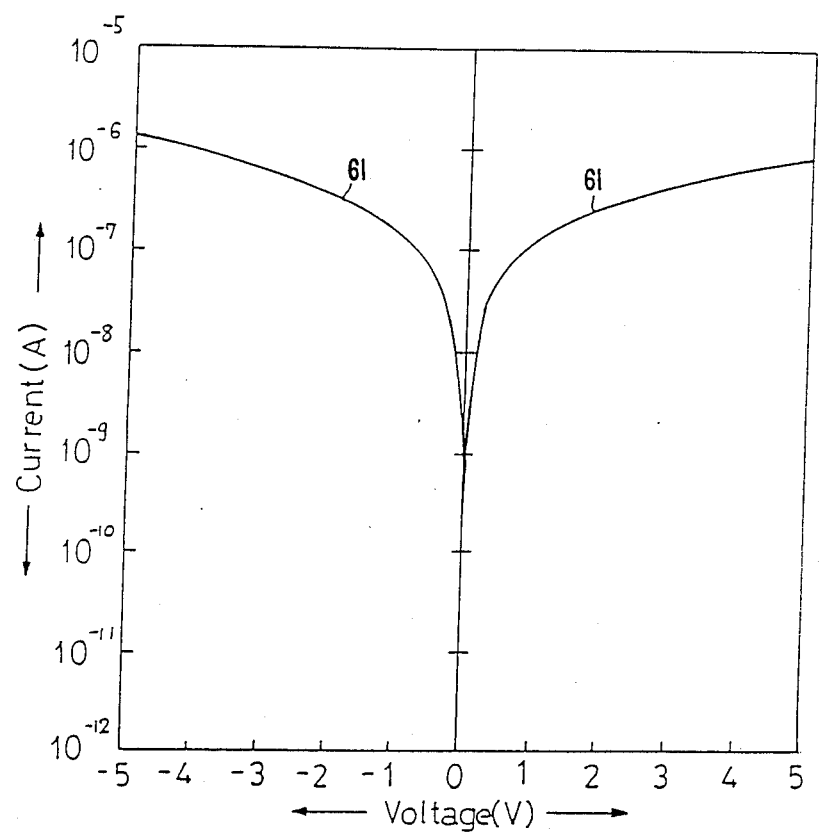
FIG. 7 is a graph showing a part of the V-I characteristics depicted in FIG. 6.

The layer member $A_{ij}$ constitute a nonlinear element $U_{ij}$ which employs the part 17 of the conductive layer $C_{ij}$ underlying the layer $Q_{ij}$ and the conductive layer $E_{ij}$ as its electrodes $D_{ij}$ and $D_{ij}'$, respectively. The nonlinear element $U_{ij}$ presents such a nonlinear voltage(V)-current(A) characteristic curves 51 and 61 as shown in FIGS. 6 and 7. The nonlinear element $U_{ij}$ as an offset voltage which is intermediate between the voltage that makes the liquid crystal element $L_{ijr}$ transparent and nontransparent, respectively.

The liquid crystal element $L_{ijr}$ and the nonlinear element $U_{ij}$ are connected in series with each other, and hence make up a liquid crystal display device $M_{ijr}$.

According to the arrangement described above with respect to FIGS. 1 through 5, the electrode $B_{ijr}$ of the liquid crystal element $L_{ijr}$ and the electrode $D_{ij}'$ of the nonlinear element $U_{ij}$ are common each other. The electrode $B_{ijr}'$ of the liquid crystal elements $L_{ijr}$ of the liquid crystal display devices $M_{ijr}$ is connected to the column conductive layer $H_{jr}$ and the electrode $D_{ij}$ of the nonlinear element $U_{ij}$ is connected to the conductive layer $F_i$. Furthermore, the column conductive layer $H_{j1}$, $H_{j2}$ and $H_{j3}$ are covered with the red, green and blue filters $S_{j1}$, $S_{j2}$ and $S_{j3}$, respectively.

Figure 8:
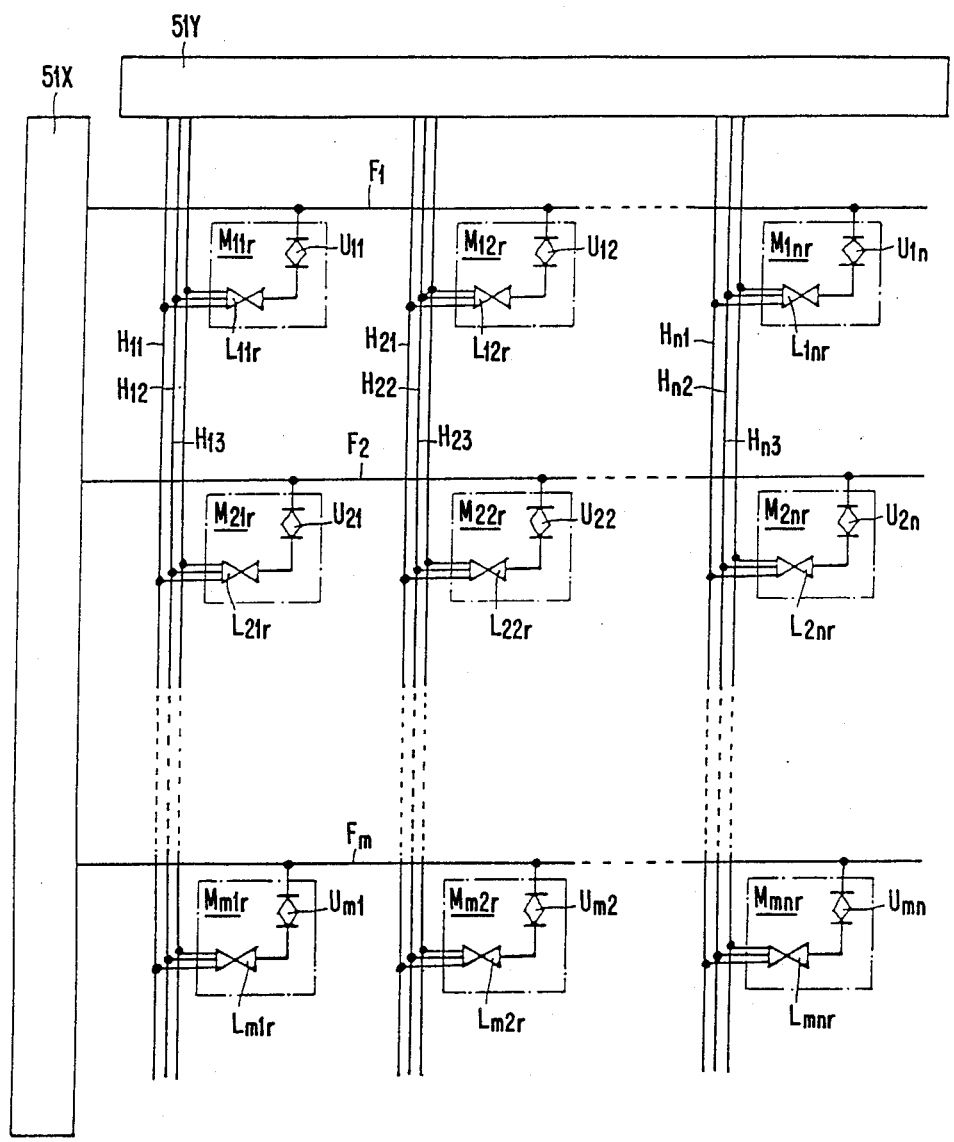
FIG. 8 is an electrical connection diagram of the liquid crystal display panel of the present invention shown in FIGS. 1 to 5.
Figure 9A:
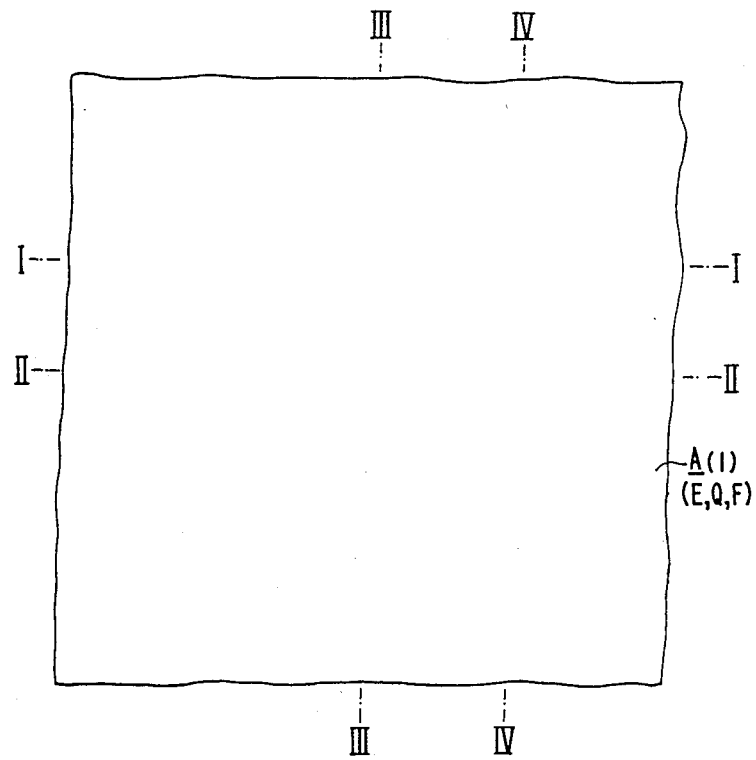
Figure 9B:
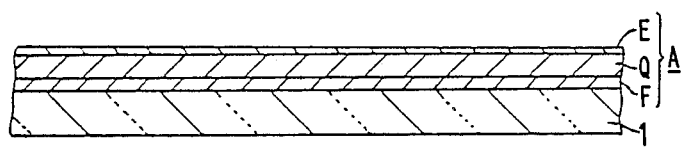
Figure 9C:
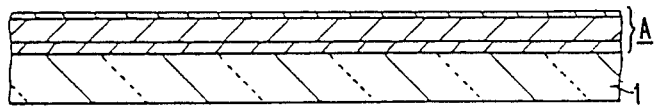
Figure 9D:
Figure 9E:
Figure 10A:
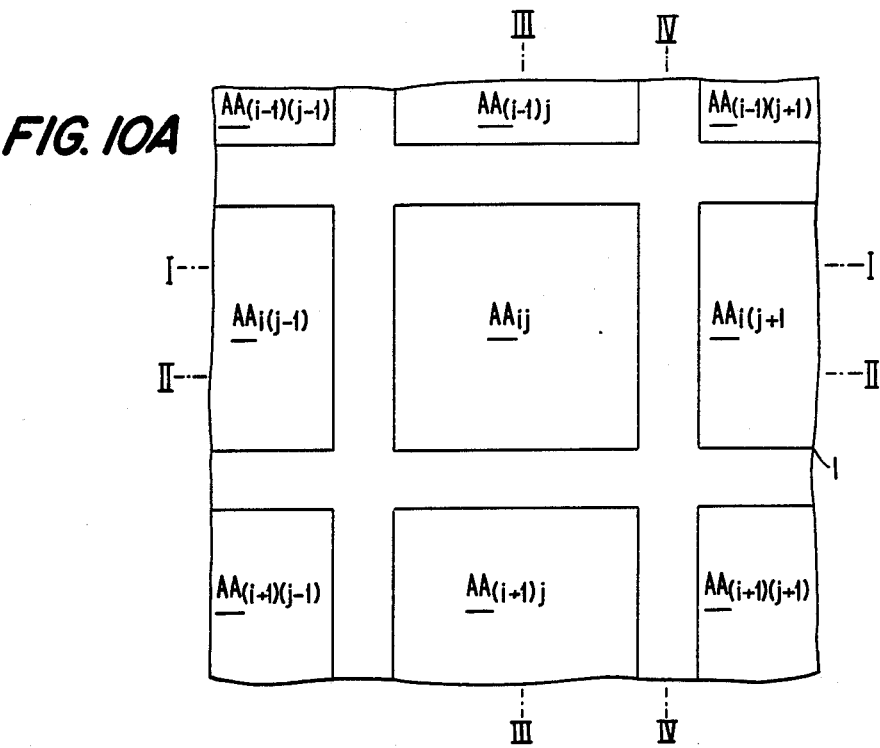
Figure 10B:
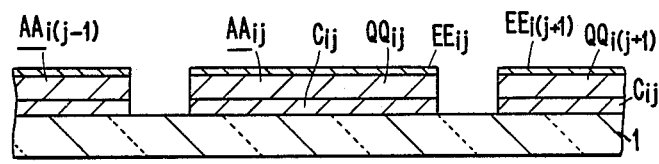
Figure 10C:
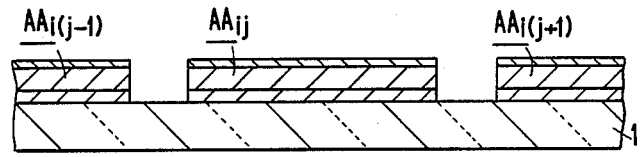
Figure 10D:
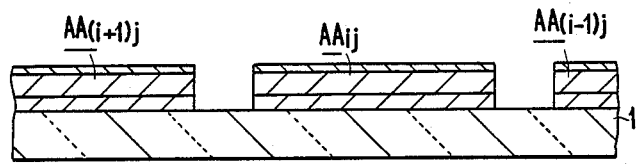
Figure 10E:
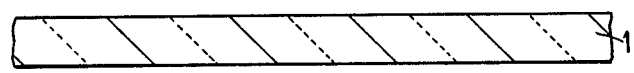
Figure 12A:
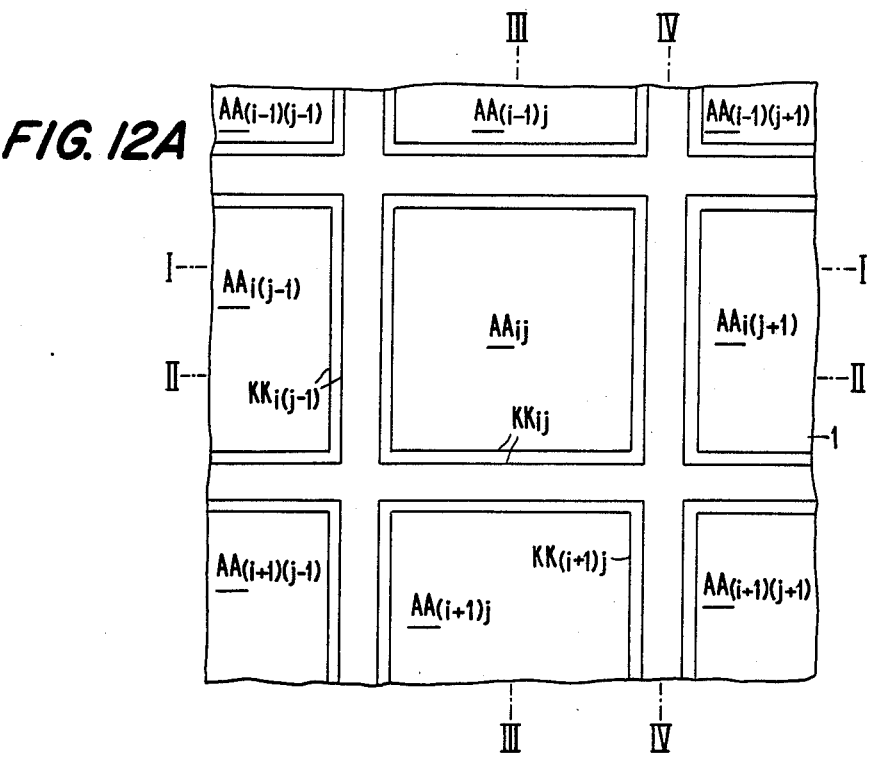
Figure 12B:
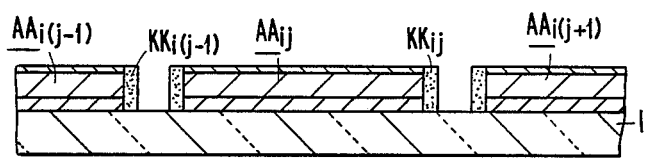
Figure 12C:
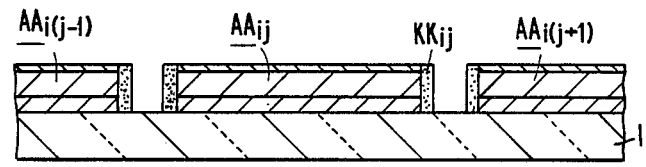
Figure 12D:
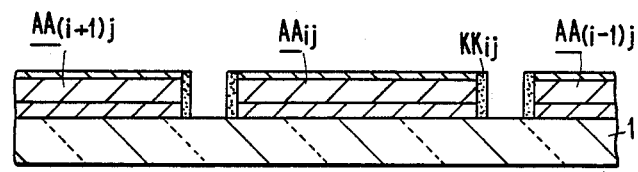
Figure 12E:
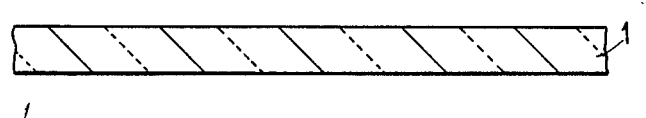
Figure 13A:
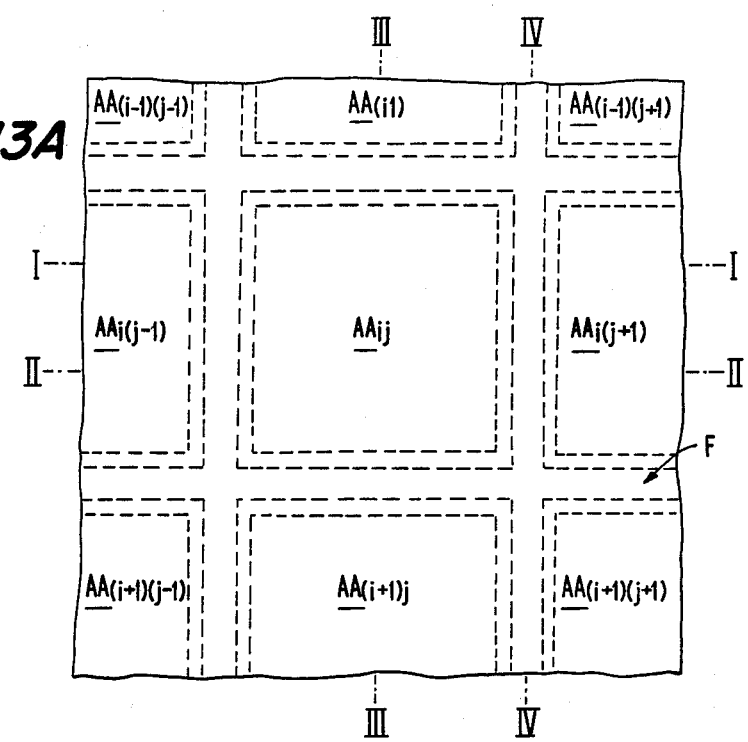
Figure 13B:
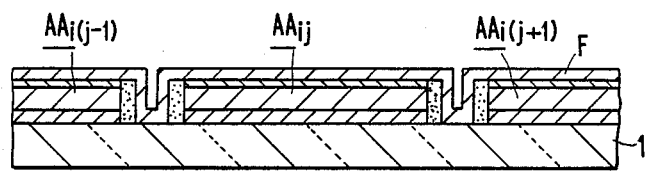
Figure 13C:
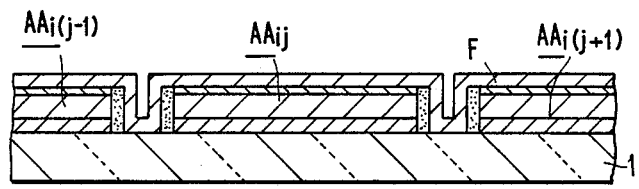
Figure 13D:
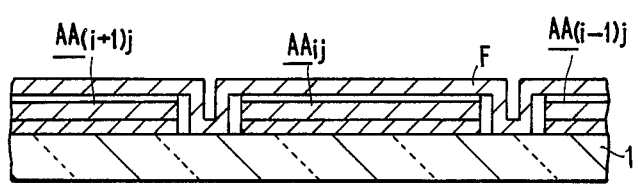
Figure 13E:
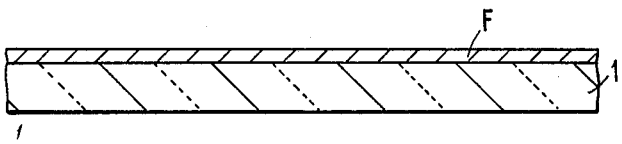
Figure 14A:
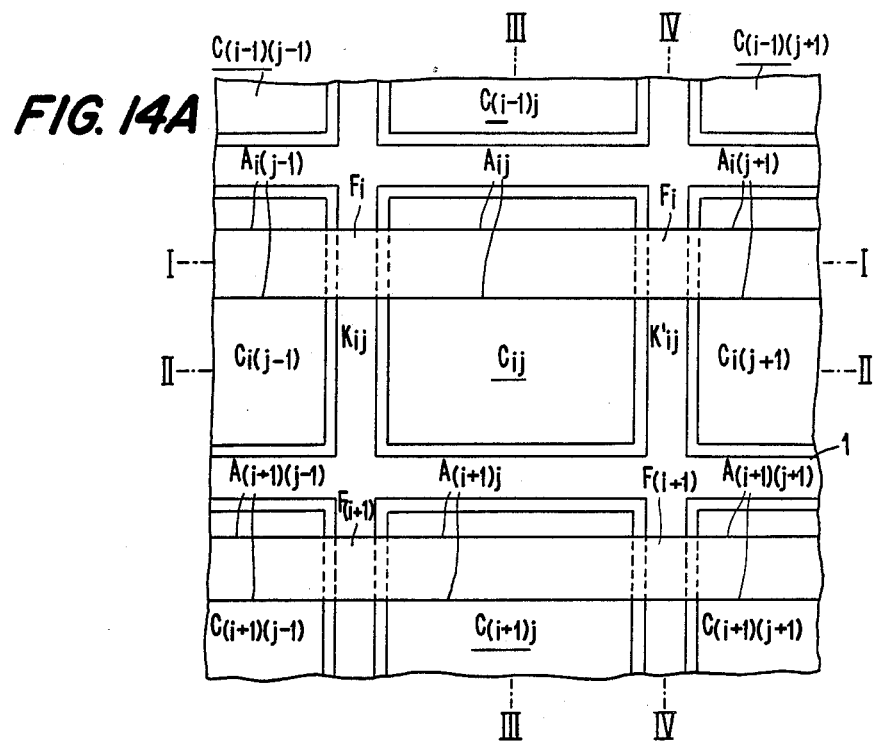
Figure 14B:
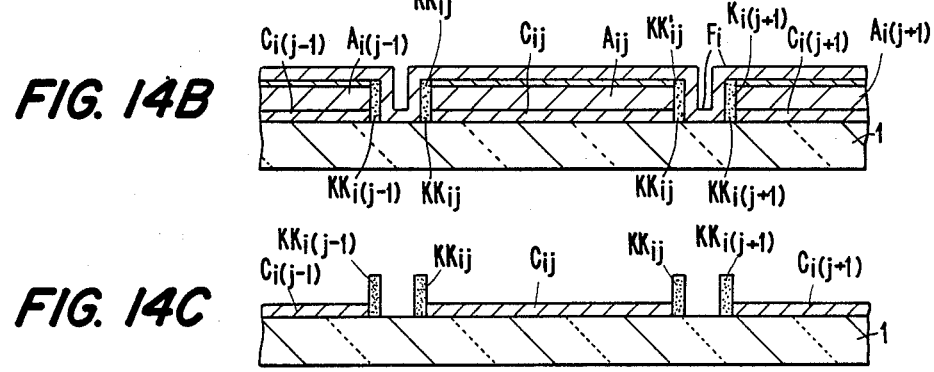
Figure 14C:
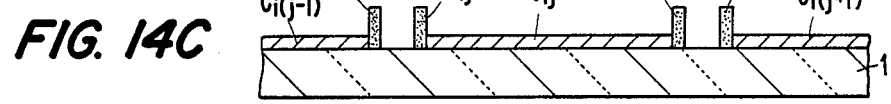
Figure 14D:
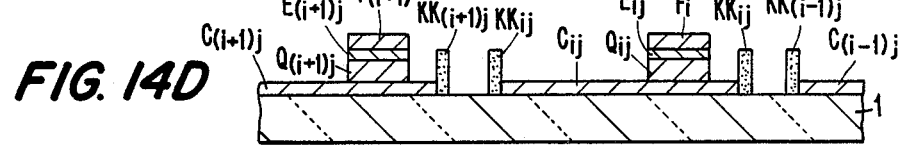
Figure 14E:
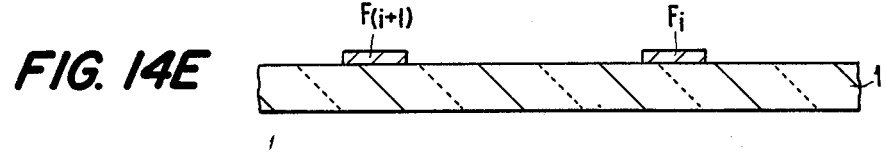

Therefore, according to the arrangement described above in connection with FIGS. 1 to 5, since the liquid crystal element $L_{ijr}$ can be controlled to be transparent or nontransparent, respectively, by applying, through use of row and column decoders 51X and 51Y, across the liquid crystal display device $M_{ij1}$, $M_{ij2}$ and $M_{ij3}$ via the conductive layers $F_i$ and $H_{j1}$, $F_i$ and $H_{j2}$, and $F_i$ and $H_{j3}$, as shown in FIG. 8, red, green and blue drive signals a color display can be provided.

Accordingly, the liquid crystal display panel shown in FIGS. 1 to 5 can be provided a color image display.

It will be apparent that the above embodiment should be construed as merely illustrative of the present invention and should not be construed as limiting the invention specifically thereto and that various modifications and variations may be effected without departing from the scope of the novel concepts of the invention.

What is claimed is:

1. A method for manufacturing a liquid crystal device comprising the steps of:
    forming a semiconductor layer on a first substrate and an underlying conductive layer;
    separating said semiconductor layer and said underlying conductive layer into electrically isolated elements of an array by removing the parts of said semiconductor and said conductive layer between the elements;
    insulating the side surfaces of said elements of said array;
    forming an overlying conductive layer on said first substrate over said array;
    removing said overlying conductive layer other than at least one strip extending over a part of each surface of the said elements arranged in a line, together with the underlying semiconductor layer whereby parts of the separated underlying conductive elements are exposed in the form of a plurality of first electrodes and whereby each separated portion of said semiconductor layer is provided with one strip of said overlying conductive layer and a portion of the said underlying conductive layer as a pair of electrodes for a semiconductor device consisting of said semiconductor layer; and
    mating said first substrate to a second substrate having a plurality of second electrodes corresponding to said first electrodes, with a liquid crystal layer inbetween.

2. A method of claim 1 wherein said insulating step comprises forming an insulating layer on said first substrate over said array, and removing said insulating layer parallel to said first substrate by anisotropic etching.

3. A method of claim 1 wherein the semiconductor layer functions as a nonlinear device.

4. A method of claim 1 further comprising the step of forming an oriented film on said first substrate over said array.

5. A manufacturing method for liquid crystal device comprising:
    forming an underlying conductive layer on a substrate;
    forming a semiconductor layer on said conductive layer;
    severing said semiconductor layer together with the underlying conductive layer into a plurality of individual segments by removing the portion of said semiconductor layer and said conductive layer located between the segments, said segments being arranged in a matrix;
    insulating the side surface of said segments;
    forming an overlying conductive layer on said substrate over said segments;
    removing a portion of said overlying conductive layer and the underlying semiconductor layer except at least one strip which extends over the segments arranged on a line, so that a substantial portion of each segment of said first conductive layer is exposed; and
    mating said first substrate to a second substrate provided with a plurality of second electrodes each of which, after mating, is opposed to the respective segment of said first conductive layer, with a liquid crystal layer inbetween.

* * * * *